United States Patent
Schwarz et al.

(10) Patent No.: US 8,204,634 B2
(45) Date of Patent: Jun. 19, 2012

(54) DRIVING DYNAMICS CONTROL SYSTEM FOR VEHICLES

(75) Inventors: Ralf Schwarz, Ingolstadt (DE); Stefan Fritz, Erzhausen (DE); Sighard Schräbler, Frankfurt am Main (DE); Urs Bauer, Ludigsburg (DE); Steffen Tröster, Metzingen (DE); Markus Weinreuter, Gross-Zimmerr (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 1401 days.

(21) Appl. No.: 10/556,575

(22) PCT Filed: May 7, 2004

(86) PCT No.: PCT/EP2004/050735
§ 371 (c)(1),
(2), (4) Date: Dec. 4, 2006

(87) PCT Pub. No.: WO2004/101337
PCT Pub. Date: Nov. 25, 2004

(65) Prior Publication Data
US 2007/0150116 A1    Jun. 28, 2007

(30) Foreign Application Priority Data
May 13, 2003 (DE) .................................. 103 21 645
Sep. 5, 2003 (DE) .................................. 103 41 412

(51) Int. Cl.
*B60G 21/00* (2006.01)
(52) U.S. Cl. ........................................ 701/1; 180/197
(58) Field of Classification Search ............... 701/1, 35, 701/48, 114; 123/406.12, 478, 491; 180/197; 700/2; 307/9.1, 10.1
See application file for complete search history.

(56) References Cited

U.S. PATENT DOCUMENTS

| | | | |
|---|---|---|---|
| 6,070,687 A * | 6/2000 | Wallace et al. | 180/287 |
| 6,213,567 B1 * | 4/2001 | Zittlau et al. | 303/20 |
| 6,873,891 B2 * | 3/2005 | Moser et al. | 701/48 |

FOREIGN PATENT DOCUMENTS

| WO | 02/100698 | 12/2002 |
|---|---|---|
| WO | 03/106235 | 12/2003 |

* cited by examiner

*Primary Examiner* — Dalena Tran

(57) ABSTRACT

The present device relates to a driving dynamics control system for vehicles, including at least one signal distribution to which vehicle data, environment data and data regarding the driver's request are sent in the form of input data, and including several controllable or regulatable subsystems which modify the dynamics of the vehicle such as a driver-independently adjustable steering system, a driver-independently adjustable chassis, a driver-independently adjustable brake, and a driver-independently adjustable driving track. The system is characterized in that the data of the signal distribution is sent to a central determining unit (driving condition detection, driver request detection), in that the central determining unit determines from the data of the signal distribution a central control target, and these items of data regarding the central control target are sent to a central regulating variable distribution or a central driving condition controller, respectively, which, in an interactive communication with the subsystems, actuates these subsystems in such a way that the control target is realized by the subsystems on the vehicle.

8 Claims, 2 Drawing Sheets

Coexistence of stand-alone control systems

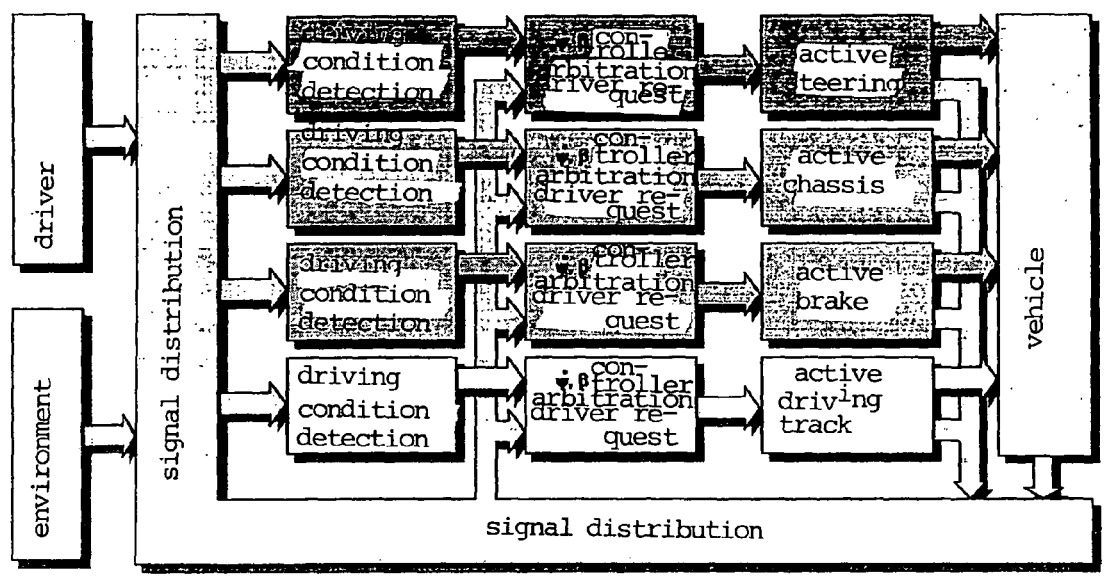
Figure 1   Coexistence of stand-alone control systems

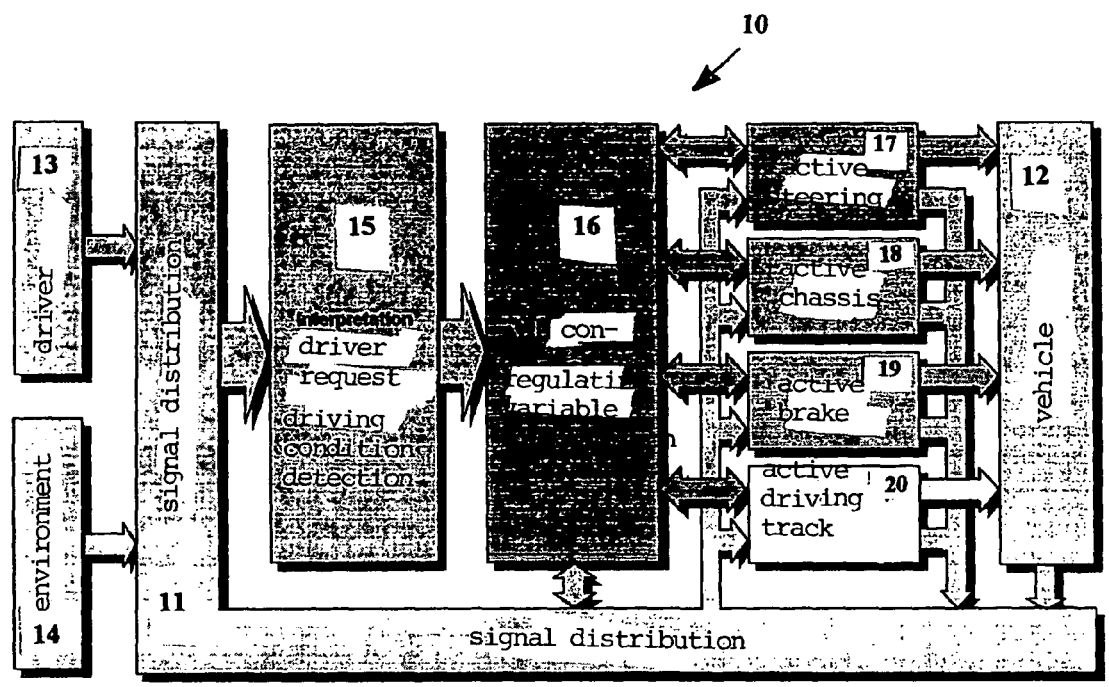
Figure 2  Integrated approach with central controller and intelligent actuators with basic functions

DRIVING DYNAMICS CONTROL SYSTEM FOR VEHICLES

BACKGROUND OF THE INVENTION

The present invention relates to a driving dynamics control system for vehicles, including at least one signal distribution to which vehicle data, environment data and data regarding the driver's request are sent in the form of input data, and including several controllable or regulatable subsystems which modify the dynamics of the vehicle such as a driver-independently adjustable steering system, a driver-independently adjustable chassis, a driver-independently adjustable brake, and a driver-independently adjustable driving track.

Both comfort and safety engineering in vehicles gain in significance. The result is that vehicles are equipped with electronic and electromechanical components or subsystems at an increasing rate. Each subsystem necessitates its own control unit in order to render sensor signals plausible, condition them, to calculate corrective signals and adjust its actuators. Each of these subsystems or control units operates, however, on its own (stand-alone) and often does not know about the others.

Apart from comfort systems such as automatic window lifters, inside adjusters of the outside rear-view mirrors, etc., mainly the number of subsystems for influencing or improving the driving performance or the driving dynamics and for improving safety is significantly rising. The trend to more electronics and electromechanics can also be found in the subsystems for influencing the driving performance or driving dynamics, respectively. Among the subsystems that allow influencing the driving performance actively, that means irrespective of the driver, are the electronic brake system, the active steering system, active and semi-active chassis components, and also the driving system in vehicles with controllable intermediate gears. Each of these subsystems is meant to influence the vehicle in such a manner that improvements in the driving performance are achieved. Depending on the subsystem concerned, the control algorithms have their focus in different fields (safety, handling, or comfort). Therefore, the subsystems are primarily tuned only for their respective control target or their main range of application, respectively. The ranges of application or the focuses of the individual subsystems overlap each other, however, in wide ranges of the driving dynamics-related range of application of vehicles. Each of these subsystems works on its own (stand-alone), although frequently the same driving dynamics quantities are intended to be influenced or controlled (FIG. 1 relating to the example of the horizontal control). This causes a very great complexity of application, above all for the mutual protection of the individual subsystems with respect to each other, and results in functional restrictions for each subsystem (i.e. each subsystem is unable to reach its control target in an ideal manner because it must not limit or hinder the other subsystems).

SUMMARY OF THE INVENTION

In view of the above, an object of the invention involves enhancing the functionality of a driving dynamics control.

This object is achieved by a driving dynamics control system for a vehicle include a signal distribution, two or more controllable subsystems which modify dynamics of the vehicle and a central determining unit that actuates the controllable subsystems based on a control target.

The fact that the data of the signal distribution is sent to a central driving condition detection, that the central determining unit determines from the data of the signal distribution a central, overall control target and these items of data regarding the central control target are sent to a central regulating variable distribution which, in an interactive communication with the subsystems, actuates these subsystems in such a way that the control target is realized by the subsystems on the vehicle, will reduce the complexity of application, above all for the mutual protection of the individual subsystems with respect to each other, and the functional restrictions for each of the subsystems are eliminated.

The division is carried out by the central driving condition controller or the regulating variable distribution itself. The driving condition controller or the regulating variable distribution is a multivariable controller, and the corresponding division of the control requests among the individual subsystems is based on the controller design (controller concept, controller approach, controller algorithm) itself, on a quality criterion or optimization criterion predetermined to the controller and/or by means of tunable weighting factors (weighting corresponding to intensity and activation order of the subsystems). For example, it may be the objective of this division that in the presence of a minor tendency to instability, the stabilization request is first of all assigned to the chassis and the steering system for comfort reasons. When there is a greater tendency to instability, the brake and the driving track, respectively, must additionally be taken into account. Depending on the controller approach, it is possible to derive a quality criterion or corresponding weighting factors for the controller design or the controller from this preset target.

BRIEF DESCRIPTION OF THE DRAWINGS

In the drawings:
FIG. 1 depicts a horizontal control system for a driving system:
FIG. 2 depicts a control system.

DETAILED DESCRIPTION OF THE DRAWINGS

The combination of all control functions of the individual actuators in a central driving dynamics control algorithm (integrated approach), compared to the stand-alone variant, achieves various advantages with respect to driving dynamics and also under topological or system-technical aspects:

- The different subsystems or intelligent actuators, respectively, are actuated by a control algorithm closed in itself in the integrated approach. Thus, the harmonious interaction of the individual intelligent actuators is structurally protected. The control of the driving condition is protected because the individual intelligent actuators corresponding to the multivariable controller approach cannot mutually influence each other negatively.
- There is a simple possibility of extending the central driving dynamics controller by new intelligent actuators because the increase in complexity is insignificant.
- The mutual consideration of the intelligent actuators in the control approach results in a reduced complexity of application (in stand-alone subsystems the actuators must be protected against each other by driving tests). The complexity rises enormously in extensions of the stand-alone subsystem network, what shows above all in a highly increasing complexity of application.
- The central network of the individual intelligent actuators in the control approach results in a low bus load and a small number of physical interfaces between the central processor and the intelligent actuators. If the stand-alone systems were 'network-connected', this would cause an extent of communication among the stand-alone systems which is difficult to control and attend to.

The shift and combination or integration, respectively, of all control functions, driving condition detections, and driver interpretations of the subsystems into a central control unit saves costs. The individual intelligent actuators require less calculating efforts in order to execute their basic functions (control operations). Thus, less costly and nearly wattless calculator units with less physical memory requirements can be used in the intelligent actuators.

The effort needed for the extension and servicing of the entire software provided in the vehicle is reduced, because it is no longer required that each subsystem has control algorithms of its own, a driving condition determining unit and a driver request detection, as is the case with the stand-alone subsystems. The control algorithms, the driving condition determining unit and the driver request detection need being extended and attended to only one time in a central fashion in the integrated approach.

A clear-cut and unambiguous separation of basic functions (controls) and driving dynamics control functions (adjustment of driving condition variables by means of feedback of variables relevant for driving dynamics such as the yaw rate, lateral acceleration, sideslip angle, etc.).

The optimal interplay between the individual subsystems results in an optimal control performance or an optimal attainment of the control targets when looking upon all functions of the vehicle. All primary control functions of the individual subsystems are grouped (integrated) centrally in a control algorithm in order to ensure optimal interaction of the individual subsystems. This means that all functions, which influence the vehicle by feedback, i.e. control of vehicle condition variables, are combined centrally in a control algorithm. Using the example of the horizontal control, this implies according to FIG. 2 that the individual subsystems (brake system, steering system, chassis system, and drive system) become intelligent actuators. The control of the driving dynamics condition is performed based on a central primary control algorithm which purposefully addresses the individual intelligent actuators in order to reach its control targets. An intelligent actuator not only adjusts nominal values of the primary driving dynamics controller but also reports its current condition and its still possible adjusting potential back to the primary driving dynamics controller, enabling the primary driving dynamics controller to take this data into account in its control strategy. In addition, each intelligent actuator has basic functions. These basic functions in turn are pure controls, that means, they act without feedback of driving dynamics variables. For example, this concerns the electronic brake force distribution in the brake system, it concerns a speed-responsive variation of the steering ratio in an active steering system, or it concerns the distribution of roll moments controlled by the lateral acceleration in a chassis system with active stabilizers. All control functions or feedbacks and adjustments of driving dynamics variables are executed in the central driving dynamics control algorithm. The determination of the current driving condition and the determination of the driver's request also take place centrally in a block connected upstream of the primary driving dynamics controller (FIG. 2).

FIG. 2 shows a driving dynamics control 10 according to the invention including a signal distribution 11. The signal distribution receives input data from the vehicle (measured variables such as the lateral acceleration, the yaw rate), from the driver 13 (direction requested by the driver by way of steering angle and/or accelerator pedal position, brake pedal position), and from the environment 14 (if measurable e.g. the angle of inclination of the roadway, the coefficient of friction of the roadway, etc.). The signal distribution 11 is connected to a determining unit 15 (driving condition detection, driver request detection) and the regulating variable distribution or the determining unit of the central driving condition controller 16 and the subsystems 17 to 20. The determining unit 15 is supplied with input data of the systems driver, vehicle and environment, and the determining unit 15 determines from this signal the nominal performance of the vehicle as desired by the driver as well as non-measurable condition and environment variables (e.g. coefficient of friction of the roadway) and sends these variables to the central driving condition controller in block 16. The regulating variable distribution or the central driving condition controller 16, respectively, communicates interactively with the signal distribution 11 and also sends to it data about the regulating variables. Said data can be fed back to the determining unit 15. The regulating variable distribution or the central driving condition controller, respectively, is connected interactively with each of the subsystems and this way conveys its control commands to the individual chassis subsystems, yet receives also this way information about their condition (e.g. operable, partly operable, inoperable) and about their current adjusting potential and takes this information of the e.g. chassis subsystems in account in its adjusting requirements. The subsystems 17-20 adjust the control commands of the central driving condition controller and furnish in turn the actual values or the adjusted or the actual condition of the respective subsystem, respectively, to the signal distribution 11 which in turn sends this information in the closed control loop to the determining unit 15 (driving condition detection and signal conditioning).

The invention claimed is:

1. A driving dynamics control system for a vehicle comprising:
   at least one signal distribution which receives vehicle data, environment data and data regarding driver's request as input data;
   two or more controllable subsystems which modify dynamics of the vehicle including one or more of a driver-independently adjustable steering system, a driver-independently adjustable chassis, a driver-independently adjustable brake, and a driver-independently adjustable driving track, wherein each of the subsystems communicate values indicative of subsystem operation to the signal distribution including values indicative of a current condition and a range of possible adjusting potential; and
   a central determining unit capable of receiving data from the signal distribution, the central determining unit determines from the received data and the communicated values indicative of subsystem operation a central control target with items of data regarding the central control target sent to a central regulating variable distribution or a central driving condition controller, that are in interactive communication with the subsystems, and actuates the two or more controllable subsystems in such a way that the control target is realized by the subsystems on the vehicle, wherein the controller determines a tunable weighting factor for each of the at least two subsystems based on current operating conditions to determine an intensity and order of operations of the subsystems responsive to a detected data communicated to the signal distribution.

2. The control system according to claim 1, wherein the central control target is divided among the subsystems and executed depending on the respective subsystems current adjusting potential and possible contribution to a current central control target.

3. The control system according to claim 1, wherein the division of the central control target among the subsystems is executed depending on a current condition of the substystem.

4. The control system according to claim 1, wherein the division of the central control target among the subsystems is executed depending on a current driving condition of the vehicle.

5. The control system according to claim 1, wherein the central control target is determined in the central driving condition detection (15) and is divided among the subsystems by the central driving condition controller (psip controller, beta controller).

6. The control system according to claim 5, wherein the division of the central control target among the subsystems is executed according to a controller concept or controller algorithm, respectively, predetermined to the central driving condition controller or the regulating variable distribution, respectively, according to a quality criterion or optimization criterion predetermined to the driving condition controller or the regulating variable distribution (16).

7. The control system according to claim 6, wherein weighting is executed corresponding to an intensity and activation order of the subsystems.

8. The control system according to claim 1, wherein actual values of subsystems communicated to the central determining unit include one of actual measured values of the subsystem, values indicative of adjustments made based on commands from the central determining unit and an actual condition of the subsystem.

* * * * *